Oct. 24, 1961　　　　G. MAULAZ　　　　3,005,570
UNIT COMPRISING A METALLIC CONTAINER WITH A CIRCULAR LID
Filed Sept. 1, 1959
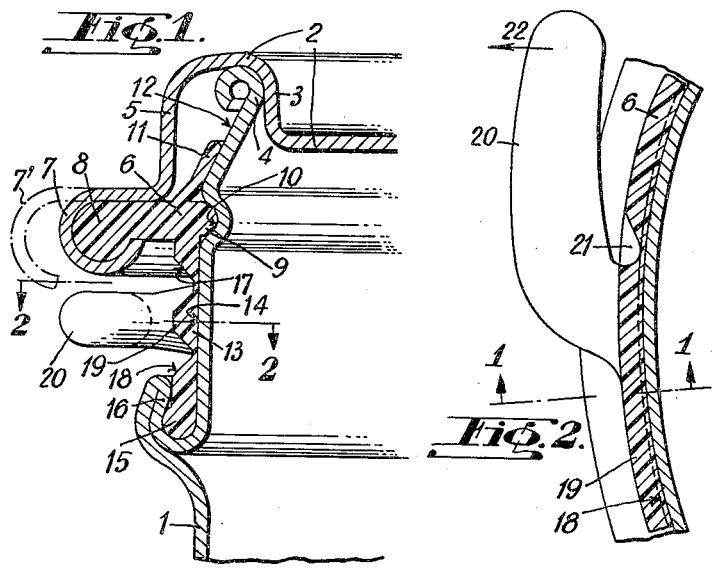
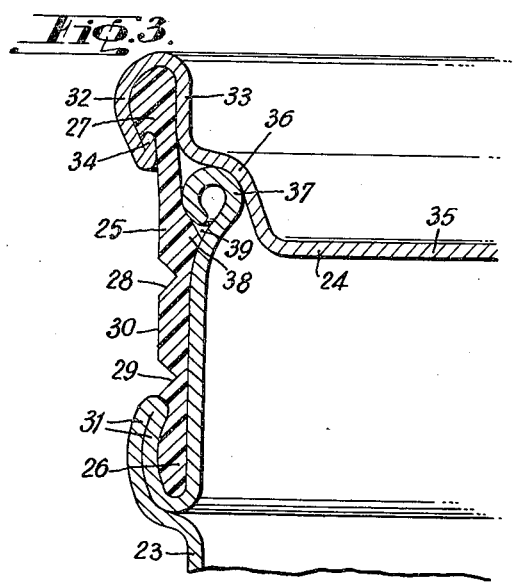
*Inventor*
GEORGES MAULAZ
By Toulmin & Toulmin
*Attorneys*

United States Patent Office 3,005,570
Patented Oct. 24, 1961

3,005,570
UNIT COMPRISING A METALLIC CONTAINER WITH A CIRCULAR LID
Georges Maulaz, Fribourg, Switzerland, assignor to Satrametal S.A., Fribourg, Switzerland, a joint-stock company of Switzerland
Filed Sept. 1, 1959, Ser. No. 837,430
Claims priority, application Switzerland Sept. 15, 1958
4 Claims. (Cl. 220—54)

The present invention has for object a unit comprising a metallic container with a circular lid and an insulating and inviolable collar of flexible material, secured in a tight manner on the one hand to the body of the container and on the other hand to the lid, characterized in that the said collar is provided with two pads engaged and clamped, the one in a circular setting in the body and the other in a circular setting in the lid, and in that the said collar is further provided, in its portion situated between the two pads, with two circular grooves defining between them an annular tearing strip, the said strip being integral with a pulling element adapted to be gripped and pulled so as to produce the tearing without a tool of the said strip by tearing the collar along the two grooves.

The accompanying drawing shows, by way of example, two embodiments of the unit according to the invention.

FIGURE 1 is a partial axial section of the first embodiment, along line 1—1 of FIG. 2.

FIGURE 2 is a view in partial cross-section along line 2—2 of FIG. 1.

FIGURE 3 is a view similar to FIG. 1, but relating to the second embodiment.

The unit shown in FIGS. 1 and 2 comprises a metallic container 1 and a lid 2, of a generally circular shape, the central portion 3 of which penetrates inside the opening 4 of the container, while the outer portion 5 of the said lid caps the end of the container when the lid is in the closed position.

The unit also comprises a tightness collar 6 of elastic pliable material, such as plastic material or rubber for example, made integral with the lid 5 by a setting 7 of the same around an annular peripheral pad 8 of the said collar. The said collar has a projecting circular portion 9, engaging in a corresponding groove 10 in the body of the container, when the lid is closed, as is clearly seen in FIG. 1.

It will be noticed that the projecting circular portion 9 and the setting 7 are in the same transversal plane relative to the axis of the lid, thus ensuring a satisfactory radial pressure of the projection 9 against the bottom of the groove 10, when the lid is closed.

The collar 6 is provided, adjacent to the portion 9, with a conical tongue 11 which, in the closed position of the lid, presses against a corresponding conical surface 12 of the outer surface of the container 1.

In this example, the collar 6 extends downwardly by a portion 13 of generally cylindrical shape, forming, as will be explained later, an inviolability collar.

The said collar 13 is in contact with a cylnidrical portion 14 of the side wall of the container 1. It is provided in its lower portion with a pad 15 which is held against the container 1 due to a portion 16 of the said container forming a circular tongue, which constitutes a setting around the said portion 15.

It will be understood that the element constituting the collars 6 and 13 ensures a tight closure of the container due to its setting at 7 on the lid and at 16 on the container. It will also be understood that, since the container cannot be opened without first of all breaking the element forming the collars 6 and 13, a guarantee of inviolability is thus realized.

In order to permit of easily opening the container, there are provided, on the portion 13 forming the inviolability collar, two parallel circular grooves 17, 18 defining between them a cylindrical strip 19. A tongue 20, of one piece with 13, projects outwardly at a certain point on the periphery of the strip 19. A transversal groove 21 is provided in the strip 19, at a level with the base of the tongue 20; it extends between the grooves 17 and 18 and to the interior of the same; it has the same depth as the latter.

The grooves 17, 18 and 21 are tearing notches, that is to say notches designed to facilitate the tearing of the strip 13 when one pulls on the tearing tongue 20, in the direction of the arrow 22. When the strip 13 has thus been separated by tearing from the element 6, the lid may be opened. The said lid may be used again, but it will then immediately be seen that it has already been previously opened since the inviolability strip is no longer intact. When it is re-used, the portion 9 pressing against the bottom of the groove 10 and the tongue 11 bearing against the conical portion 12, the lid fits tightly on the container.

For filling and closing the container according to FIGS. 1 and 2, two possibilities are offered. If the container 1 is of one piece with its bottom (not shown), the container is filled before placing the lid and after the securing of the pad 15 by the portion 16. Once the filling is finished, the lid is placed on the container. The portion 7 is in the open condition shown by dot and dash lines at 7'. This accomplished, the portion 7' is rolled around the pad 8, so as to adopt the shape shown by 7. A tight fit is therefore produced between the tightness collar and the lid.

If the container is of the type having a bottom fitting in the body, the easiest method is to fill the container from below, before fixing the bottom, and then close by setting the bottom. In this case, obviously, the lid is placed on and secured to the tightness strip before filling.

In the second embodiment (FIG. 3), 23 is the body of the container, 24 the lid and 25 the tightness and inviolability strip. The said strip 25 is provided with a lower peripheric pad 26 and an upper peripheric pad 27. In its centre portion there are provided two parallel grooves 28, 29 leaving between them a strip 30 designed to be torn by means of a tongue similar to 20 and a transversal groove similar to 21 (FIG. 2).

The body of the container is provided with a peripheric fold 31 serving to set the pad 26, before filling the container. As for the pad 27, it is tightly fitted to the lid 24 by means of a setting 32 of the edge of the said lid. The said setting may be effected in a perfect manner and without difficulty after filling, due to the fact that it is opposite a cylindrical peripheric portion 33 of the lid situated beyond the upper edge 37 of the container. The extreme edge 34 of the setting 32 is folded inwardly to ensure perfect clamping and fixing of the lid on the pad 27.

The lid is provided with a plane central portion connected to the cylindrical portion 33 by an oblique portion 36 by means of which the said lid bears against the upper end 37 of the container. Thus, the closed position of the lid is mechanically fixed, thus facilitating the formation of the setting 32.

The upper end 37 is rolled so as to form a circular pad. The collar 25 is provided in the region adjacent to 37, with an inner annular projection 38 which, when the lid is closed engages inside a circular hollow 39 in the wall of the container, the projection 38 bearing elastically against the outer surface of the container at 39.

When the collar 25 has been broken by tearing the middle strip 30, the portion of the collar which remains integral with the lid comprises a conical portion which, when the lid is used again after opening the container, caps the edge 37 and ensures a satisfactory closing of the lid on the container, due to the cooperation of 38 with 39.

What I claim is:

1. A container comprising a body and a circular closure, said body and said closure having bent flanges, the bent portions thereof facing each other, a collar of resilient material provided with two circular grooves and having a pad at each end thereof, said collar being in firm engagement with the surface of said body intermediate said flanges and said collar having a conical tongue which firmly engages the outside of said body when said circular closure is in engagement with the upper pad of said collar, said pads being fixedly clamped by the bent portions of said flanges, and an annular tearing strip in said collar defined by said two grooves, said strip having a pulling element whereby said strip can be torn off along said two grooves.

2. A container comprising a body and a circular closure, said body and said closure having bent flanges, the bent portions thereof facing each other, a collar of resilient material provided with two circular grooves and having a pad at each end thereof, said collar being in firm engagement with the surface of said body intermediate said flanges, said collar further being provided with an inner annular projecting portion and said body being provided with an annular groove, said portion and said groove being in the same transverse plane relative to the axis of the closure, said pads being fixedly clamped by the bent portions of said flanges, and an annular tearing strip in said collar defined by said two grooves, said strip having a pulling element whereby said strip can be torn off along said two grooves.

3. A container as claimed in claim 2, wherein said portion and said groove are in firm engagement with each other when said closure is being re-applied onto said body after removal of said tearing strip.

4. A container comprisnig a body and a circular closure, said body and said closure having bent flanges, the bent portions thereof facing each other, and said body further having an annular inwardly projecting recess, a collar of resilient material provided with an inner annular projecting portion and with two circular grooves and having a pad at each end thereof, each pad having a preformed circular indentation, said collar being in firm engagement with the surface of said body intermediate said flanges, and said pads being fixedly clamped by the engagement of the bent portions of said flanges into said indentations, said inner annular projection being engaged in said inwardly projecting recess and an annular tearing strip in said collar defined by said two grooves, said strip having a pulling element whereby said strip can be torn off along said two grooves.

References Cited in the file of this patent
UNITED STATES PATENTS

| | | |
|---|---|---|
| 1,895,386 | Aulbach | Jan. 24, 1933 |
| 2,433,683 | Coyle | Dec. 30, 1947 |
| 2,747,345 | Plastino | May 29, 1956 |
| 2,818,194 | Pagels | Dec. 31, 1957 |